Aug. 14, 1962   A. M. PALOMBO   3,049,444
FOAMED CELLULAR SYNTHETIC MATERIAL IMPREGNATED
WITH A WETTING AGENT
Filed June 24, 1959
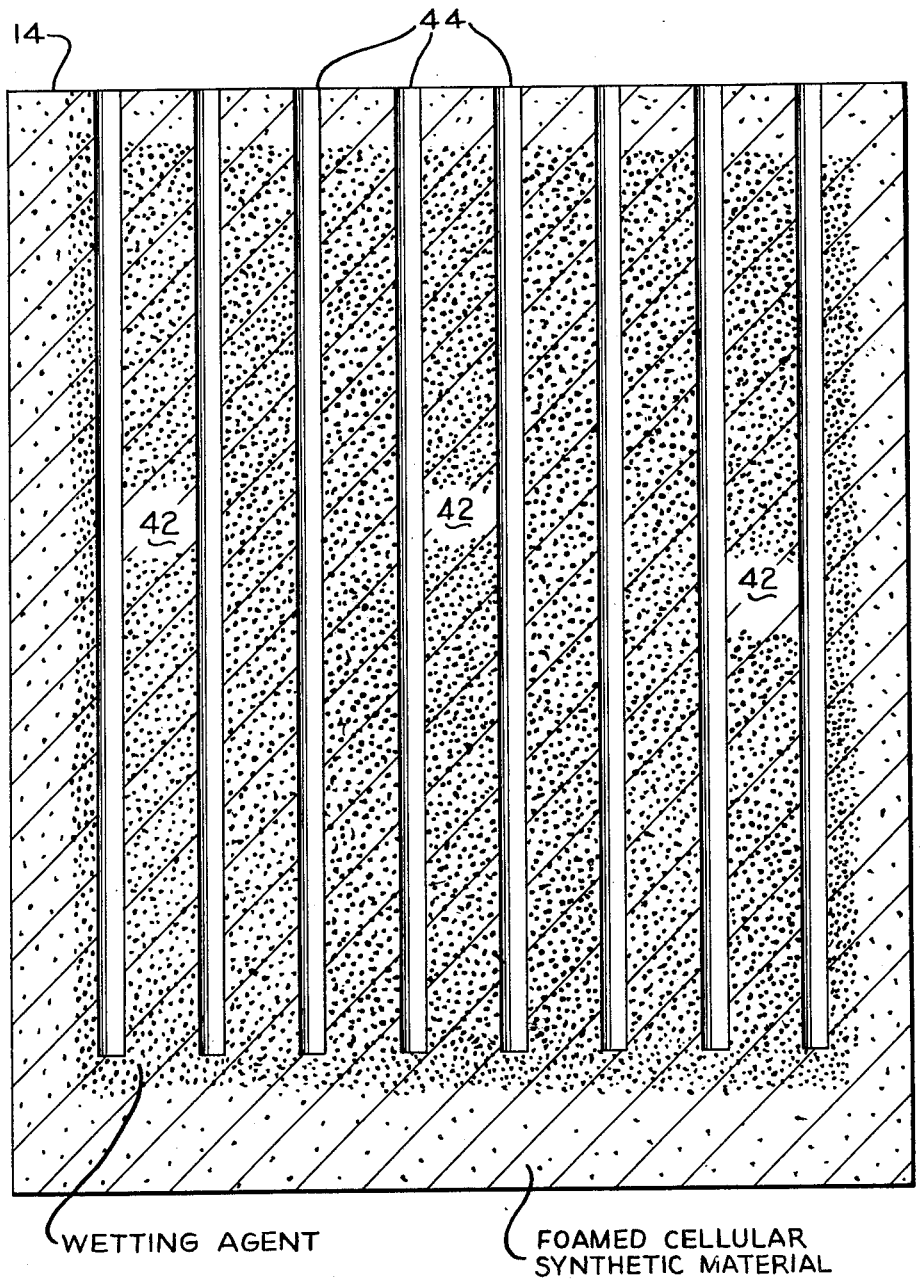
INVENTOR.
ALBERT M. PALOMBO
BY Hofgren, Brady
Wegner, Allen & Stellman
ATTORNEY.

3,049,444
FOAMED CELLULAR SYNTHETIC MATERIAL IMPREGNATED WITH A WETTING AGENT
Albert M. Palombo, Medford, Mass., assignor to American Metaseal of Massachusetts, Inc., a corporation of Massachusetts
Filed June 24, 1959, Ser. No. 822,594
2 Claims. (Cl. 117—138.8)

This invention relates to improvements in impregnated articles especialy well adapted for floral displays.

In the patent to Smithers, No. 2,753,277, dated July 3, 1956, there was disclosed the application of a layer of wetting agent on the exterior of a mass of a foamed synthetic material selected from the group consisting of urea-formaldehyde and a phenolic condensation resin. It has been found that where such masses are coated externally by such wetting agents, the time during which the masses must be held submerged in water in order to saturate them is excessive and, accordingly, expensive.

After extended research, the present invention has evolved rendering it possible to provide a product which requires a much shorter period of submergence to achieve the required degree of saturation to serve the purpose for which the articles are intended.

The product is an impregnated article which assumes the form of a water retentive mass of foamed cellular synthetic material selected from the group consisting of urea-formaldehyde and a phenolic condensation resin, the mass having exterior surfaces at least one of which is penetrated by a plurality of parallel passages, and a wetting agent distributed adjacent said passages and disposed entirely within the mass in spaced relationship to the exterior surfaces. The mass preferably has opposed exterior surfaces penetrated by the passages. The wetting agent is disposed along such passages in spaced relationship to the exterior surfaces.

A more complete understanding of the invention will follow a description based upon the accompanying drawing wherein the FIGURE is a section of an embodiment of an impregnated article.

As in connection with the Smithers Patent No. 2,753,277 to which reference has been made, the invention will be described with reference to a mass of foamed cellular synthetic material selected from the group consisting of urea-formaldehyde and a phenolic condensation resin. As set forth in the specification of that patent, phenol-formaldehyde resin in liquid form is supplied by the manufacturer thereof in graduated viscosities. A batch of any convenient size is measured out, the desired viscosity being secured by mixing measured amounts of selected viscosities depending upon the density of the foam to be produced. To the batch there is added a small amount of an agent which will impart some degree of softness and resilience to the finished product, for which purpose a water diluted material marketed as "Tween" may be employed. "Tween" is alleged to be polyoxyethylene sorbitan mono palmitate and will hereinafter be referred to as such. Isopropyl ether or a mixture of isopropyl ether and polyoxyethylene sorbitan mono palmitate may be employed. Other materials such as those described in United States Patent No. 2,446,429 may be utilized for the purpose. Approximately 1% of polyoxyethylene sorbitan mono palmitate by weight may be added to the resin batch, and then to the batch may be added the foaming agent and a hardener or catalyst. The foaming agent and hardener may consist of sulphuric acid, isopropyl ether and phosphoric acid whose proportions may be varied to produce the desired results in accordance with techniques well known in the art.

As has been described by the prior art, the resin mix may be placed in a bottomless container which is lined with paper and placed in a large pan over which a paper lined collapsible mold is lowered, the mold having an opening in registry with the container. The mold is telescopic with respect to the pan so that it may rise as the foam is generated. A stirrer is then lowered into the resin and the foaming and hardening agent added to the resin. After the reagents have been thoroughly incorporated in the mass and before the actual foaming begins, the stirrer and the container may be removed and a cover placed over the opening in the mold. The foaming operation now occurs, elevating the mold, the paper linings defining a covering about the final product. After the foaming reaction has been concluded, the mold is removed and the block of foam has any residual gases separated therefrom. The mass or block of foam thus formed absorbs water very poorly despite the fact that it usually contains about 45% open cells. As is well known in the art, a block of such foam weighing 0.06 lb. immersed in water for 30 minutes absorbs only 0.19 lb. of water; immersed for 60 minutes it absorbs only 0.21 lb. of water; and immersed for 6 hours absorbs only 0.24 lb. of water.

Whereas the application of an exterior coating of a wetting agent to such a block improves the absorptive properties of the foam as set forth in the Smithers Patent No. 2,753,277, the degree and rate of absorption of water have been greatly increased in accordance with the present invention by distributing a wetting agent throughout the interior of the mass or block but in spaced relationship to the exterior surfaces thereof so as to avoid loss of any of the wetting agent through handling.

Many types of wetting agents may be employed for purposes of the present invention including polyglycol ether, artificial soaps, and such products marketed under the names "Igepal" (reputedly alkyl phenoxy polyoxyethylene ethanol) and "Renex No. 35." The amount of wetting agent employed will be small enough to avoid adverse effects on the flowers to be supported. The impregnated product of the present invention absorbs water from six to ten times as rapidly as where the wetting agent is applied as an external film.

In the manufacture of an impregnated article which is a water retentive block of frangible foamed cellular synthetic material, an apparatus such as that described in my co-pending divisional application Serial No. 185,584, can be used. Accordingly, the fluid or liquid wetting agent is injected under pressure from a valve controlled chamber, through a plurality of nozzles and into the interior of the foamed cellular material through passages therein. For example, an expansible chamber is filled with the liquid wetting agent and the wetting agent is ejected therefrom through the plurality of nozzles and into the foamed cellular work piece by force between the chamber-nozzle assembly and the work piece, which force results in compression of the chamber and ejection of the fluid through the plurality of nozzles and into the interior of the cellular material via the passages. The wetting agent ejected from the ends of the nozzles is distributed internally of the mass of cellular material. The nozzles are tubular and are moved into the passages in the cellular material during impregnation a distance sufficient to penetrate almost through the cellular work piece. Upon impregnating one work piece, the process may, of course, be repeated with other work pieces, as is described in my divisional application identified above.

A cross section through the foamed cellular synthetic mass 14 after it has been impregnated appears in the drawing wherein the denser stippling denotes the presence of the wetting agent 42 and the lighter peripheral stippling indicates the portion which is completely free from the wetting agent. It will be noted that the mass contains a plurality of parallel passages 44 corresponding in number and spacing to the tubular nozzles through which the wetting agent is ejected. The presence of these passages 44 permits the rapid entry of water when the mass is submerged therein so that the mass will become completely saturated in far less time than has been the case with any product proposed heretofore.

The impregnated material can be used to support flowers by the insertion of their stems into the saturated mass in the manner already known in the art.

Variations of the apparatus and product as will be suggested by the foregoing disclosure to those skilled in the art are contemplated by the appended claims.

I claim:

1. A water retentive block of frangible foamed cellular synthetic material selected from the group consisting of urea-formaldehyde and a phenolic condensation resin, said mass having exterior surfaces at least one of which is penetrated by small passages extending into the interior of said mass from said one surface substantially to but not all the way to an opposite surface and a wetting agent distributed adjacent said passages substantially entirely within said mass and spaced from said exterior surfaces.

2. The water retentive block of claim 1 wherein said passages are substantially parallel.

References Cited in the file of this patent

UNITED STATES PATENTS

| | | |
|---|---|---|
| 886,984 | Jopling | May 5, 1908 |
| 1,456,344 | Van Ness | May 22, 1923 |
| 2,032,028 | Rees | Feb. 25, 1936 |
| 2,619,257 | Posner | Nov. 25, 1952 |
| 2,753,277 | Smithers | July 3, 1956 |
| 2,784,882 | Bois | Mar. 12, 1957 |

FOREIGN PATENTS

| | | |
|---|---|---|
| 1,015,864 | France | Oct. 27, 1952 |